United States Patent
Schwab et al.

(10) Patent No.: US 6,921,729 B2
(45) Date of Patent: *Jul. 26, 2005

(54) ADHESIVE TAPE

(75) Inventors: Jeffrey J. Schwab, Inver Grove Heights, MN (US); Patrick S. Seleski, Harris, MN (US); David J. Kinning, Woodbury, MN (US); Audrey A. Sherman, St. Paul, MN (US); Gregory D. Kostuch, Mahtomedi, MN (US); Wendi J. Winkler, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 120 days.

This patent is subject to a terminal disclaimer.

(21) Appl. No.: 10/334,744

(22) Filed: Dec. 31, 2002

(65) Prior Publication Data

US 2004/0127121 A1 Jul. 1, 2004

(51) Int. Cl.[7] .............................................. B23B 27/12
(52) U.S. Cl. .............................. 442/43; 442/46; 442/49; 442/58; 442/149; 442/151; 428/343; 428/352; 428/355 R; 428/355 AC; 525/191; 525/209; 525/217; 525/218; 525/221; 525/222; 525/240
(58) Field of Search ................................. 428/343, 352, 428/355 R, 355 AC; 442/43, 46, 49, 58, 149, 151; 525/191, 209, 217, 218, 221, 222, 240

(56) References Cited

U.S. PATENT DOCUMENTS 2,532,011 A 11/1950 Dahlquist et al.
2,607,711 A 8/1952 Hendricks
2,736,721 A 2/1956 Dexter
3,011,988 A 12/1961 Luedke et al.

(Continued)

FOREIGN PATENT DOCUMENTS

| EP | 0 484 093 A2 | 5/1992 |
| WO | WO 00/04107 | 1/2000 |
| WO | WO 00/61693 | 10/2000 |
| WO | WO 00/75210 A1 | 12/2000 |
| WO | WO 01/72918 A1 | 10/2001 |

OTHER PUBLICATIONS

ASTM D3330–90, Standard Test Methods for Peel Adhesion of Pressure–Sensitive Tape at 180° Angle.
ASTM D3811, Standard Test Method for Unwind Force of Pressure–Sensitive Tapes.
ASTM D2857–93, Standard Practice for Dilute Solution Viscosity of Polymers.
Ciba UVITEX OB Fluorescent Whitening Agent, Printed Nov. 1999, 2 pages.
ExxonMobile LD 129 Low Density Polyethylene for Cast Overwrap Film, Printed Oct. 20, 1999, 1 page.
Mayzo, RA–95H Release Coat, Product Data Sheet, 2 pages.
U.S Appl. No. 10/334,962, filed Dec. 31, 2002, Release Compositions and Articles Made Therefrom.

*Primary Examiner*—Ula C. Ruddock
(74) *Attorney, Agent, or Firm*—Trisha D. Adamson

(57) ABSTRACT

Adhesive tapes (e.g., duct tapes) having a backing comprising a compatibilized release composition are reported. The compatibilized release composition comprises a thermoplastic olefin-based polymer comprising an acid or a base functionality and a polymeric release material comprising an acid or a base functionality. The functionality of the thermoplastic olefin-based polymer and the functionality of the polymeric release material provide an acid-base interaction that compatibilizes the release composition.

24 Claims, 3 Drawing Sheets

U.S. PATENT DOCUMENTS

| | | |
|---|---|---|
| 3,437,622 A | 4/1969 | Dahl |
| 3,718,712 A | 2/1973 | Tushaus |
| 4,379,806 A | 4/1983 | Korpman |
| 4,545,843 A | 10/1985 | Bray |
| 4,728,571 A | 3/1988 | Clemens et al. |
| 4,922,113 A | 5/1990 | Melancon |
| 5,108,815 A | 4/1992 | Adams et al. |
| 5,154,962 A | 10/1992 | Mertens et al. |
| 5,162,150 A | 11/1992 | Buis et al. |
| 5,209,971 A | 5/1993 | Babu et al. |
| 5,214,119 A | 5/1993 | Leir et al. |
| 5,229,179 A | 7/1993 | Kumar et al. |
| 5,525,375 A | 6/1996 | Wang et al. |
| 5,591,820 A | 1/1997 | Kydonieus et al. |
| 5,641,835 A | 6/1997 | Smith et al. |
| 5,700,571 A | 12/1997 | Logue et al. |
| 5,728,469 A | 3/1998 | Mann et al. |
| 6,146,756 A | 11/2000 | Ausen et al. |
| 6,348,262 B1 | 2/2002 | Huffman |
| 6,352,766 B1 | 3/2002 | Crandall et al. |
| 6,372,342 B1 | 4/2002 | Karaoglu |
| 2003/0215628 A1 * | 11/2003 | Ma et al. .................... 428/343 |

* cited by examiner

US 6,921,729 B2

ADHESIVE TAPE

FIELD

The invention relates to adhesive tapes including those commonly referred to as duct tapes. More particularly the invention relates to adhesive tapes having a release layer comprising a compatibilized release composition.

BACKGROUND

Duct tapes are a common and widely used type of adhesive tape. Duct tapes typically comprise a scrim, a polymer film backing, and an aggressive, rubber resin-based pressure sensitive adhesive that is coated over the scrim and the backing. The scrim provides strength to the tape and additionally allows the tape to be hand torn.

Presently, the melt blown polyethylene films used to make duct tape backings either do not contain a release material or use low molecular weight release materials (e.g., waxes) that can bloom to the free surface of the backing and provide a release function. Without the use of release material, the unwind forces of duct tapes made with such films are extremely high due to the aggressive nature of the pressure sensitive adhesive employed. However, the low molecular weight release materials are cohesively weak and are not strongly bound to the film surface; therefore, the release material can transfer to the adhesive surface when the tape roll is unwound, resulting in reduced adhesion levels.

Conventional polymeric release materials could be applied to the duct tape backing in a separate step, but this adds additional cost to the resulting product. Alternatively, a polymeric release material could be mixed with an extrudable polymer, for example, polyolefin and extruded to form a release layer. However, incompatibility between these materials often requires that the polymer and the polymeric release material be pre-blended and pelletized to provide a homogeneous feed for an extruder. This blending and pelletizing process adds additional cost to the resulting tape backing.

In view of the foregoing, what is desired is an adhesive tape backing that includes a release layer comprising a polymeric release material that can be produced via a coextrusion process wherein the materials making up the release layer can be fed directly to an extruder without first mixing and pelletizing. Desirably, the resulting release layer will not transfer to a pressure sensitive adhesive.

SUMMARY

The present invention provides adhesive tapes (e.g., duct tapes) including a release layer comprising a compatibilized release composition. Advantageously, embodiments of the compatibilized release compositions can be fed directly into an extruder without pre-blending and pelletizing of the components making up the compatibilized release composition. In addition, embodiments may be resistant to the transfer of the polymeric release material, for example, to a pressure sensitive adhesive removed directly from a release layer comprising the compatibilized release composition.

In one aspect the adhesive tape comprises:
(a) a backing comprising:
(i) a release layer comprising a compatibilized release composition comprising:
a thermoplastic olefin-based polymer comprising an acid or a base functionality;
a polymeric release material comprising an acid or a base functionality;
wherein the functionality of the thermoplastic olefin-based polymer and the functionality of the polymeric release material provide an acid-base interaction; and
(ii) a substrate layer;
(b) a scrim; and
(c) a pressure sensitive adhesive layer coated over the scrim and the substrate layer of the backing.

Backings for adhesive tapes of the present invention comprise a substrate layer in the form of a film having opposite first and second major surfaces and a release layer comprising a compatibilized release composition adhered to at least a portion of one major surface of the substrate. In certain embodiments, the substrate layer comprises a multi-layered film, for example, comprising 2 or more layers. In certain embodiments, the substrate and the release layer are co-extruded, for example, using a blown film extrusion process with a multi-layer extrusion die.

The release layer comprises a compatibilized release composition comprising a thermoplastic olefin-based polymer comprising an acid or a base functionality and a polymeric release material comprising an acid or a base functionality. The functionality of the thermoplastic olefin-based polymer and the functionality of the polymeric release material are selected to provide an acid-base interaction that compatibilizes the thermoplastic olefin-based polymer with the polymeric release material. For example, the thermoplastic olefin-based polymer may be acid functionalized and the polymeric release material base functionalized. Alternatively, the thermoplastic olefin-based polymer may be base functionalized and the polymeric release material acid functionalized.

Representative examples of the polymeric release material include polyvinyl N-alkyl carbamates, polyvinyl N-alkyl carbamides, poly alkyl(meth)acrylate copolymers, silicone polyurea segmented copolymers, and siloxane-acrylate block or graft copolymers. In certain embodiments the polymeric release material comprises from about 1% to about 30% by weight of the release composition. In certain preferred embodiments, the polymeric release material is polyvinyl octadecyl carbamate.

Representative examples of acid-modified thermoplastic olefin-based polymers include ethylene/acrylic acid copolymers, ethylene/methacrylic acid copolymers, and acid-modified ethylene/vinyl acetate copolymers. Representative examples of base-modified thermoplastic olefin-based polymers include ethylene/vinyl acetate copolymers. In certain embodiments the thermoplastic olefin-based polymer comprises from about 1% to about 99% by weight of the release composition, more typically comprising about 70% to about 99% by weight of the release composition. In certain embodiments, the thermoplastic olefin-based polymer is an ethylene/acrylic acid copolymer comprising about 3% to about 20% by weight acrylic acid.

The compatibilized release composition may further comprise a diluent polymer. Examples of diluent polymers include polyolefins (e.g., polyethylene) or polyolefin copolymers (e.g., ethylene/propylene copolymers). In embodiments including a diluent polymer, the diluent polymer typically comprises about 40% to about 98% by weight of the compatibilized release composition with the thermoplastic olefin-containing polymer typically comprising about 1% to about 60% by weight of the compatibilized release composition, and the polymeric release material typically comprising about 1% to about 30% by weight of the compatibilized release composition.

Polymers useful for the substrate layer of the backing include thermoplastic polymers, preferably thermoplastic polymers that can be extruded (e.g., using a blown film or cast film extrusion process). Preferred thermoplastic polymers include polyolefins such as low density polyethylene (LDPE), high density polyethylene (HDPE), linear low density polyethylene (LLDPE) and polypropylene. In certain embodiments, the substrate is a multi-layered film including 2 or more layers of polyethylene.

A pressure sensitive adhesive layer is coated over the scrim and the substrate layer of the backing. Representative examples of pressure sensitive adhesives include those based on natural rubber, synthetic rubber, or acrylic.

The scrim comprises a plurality of warp elements and a plurality of weft elements that are woven or knitted together to form the scrim. The warp elements extend longitudinally along the backing layer and are uniformly transversely spaced from one another. The weft elements extend transversely along the backing layer typically at right angles to the warp elements. The scrim adds reinforcement to the adhesive tape and additionally provides a series of tear guides to allow the adhesive tape to be torn in straight fashion. The scrim may be made of natural or synthetic materials and is commonly made up of polyester multi-filament yarns.

BRIEF DESCRIPTION OF THE DRAWINGS

The invention will be further explained with reference to the figures, wherein.

The figures are intended to be merely illustrative, are not to scale, and are not limiting of the invention.

DETAILED DESCRIPTION

The present invention provides adhesive tapes such as duct tapes comprising a backing having a first and second major surface; a release layer at least partially covering the first major surface of the backing; an adhesive layer at least partially covering the second major surface of the backing; and a scrim adhered to the backing by the adhesive.

Figure 1:
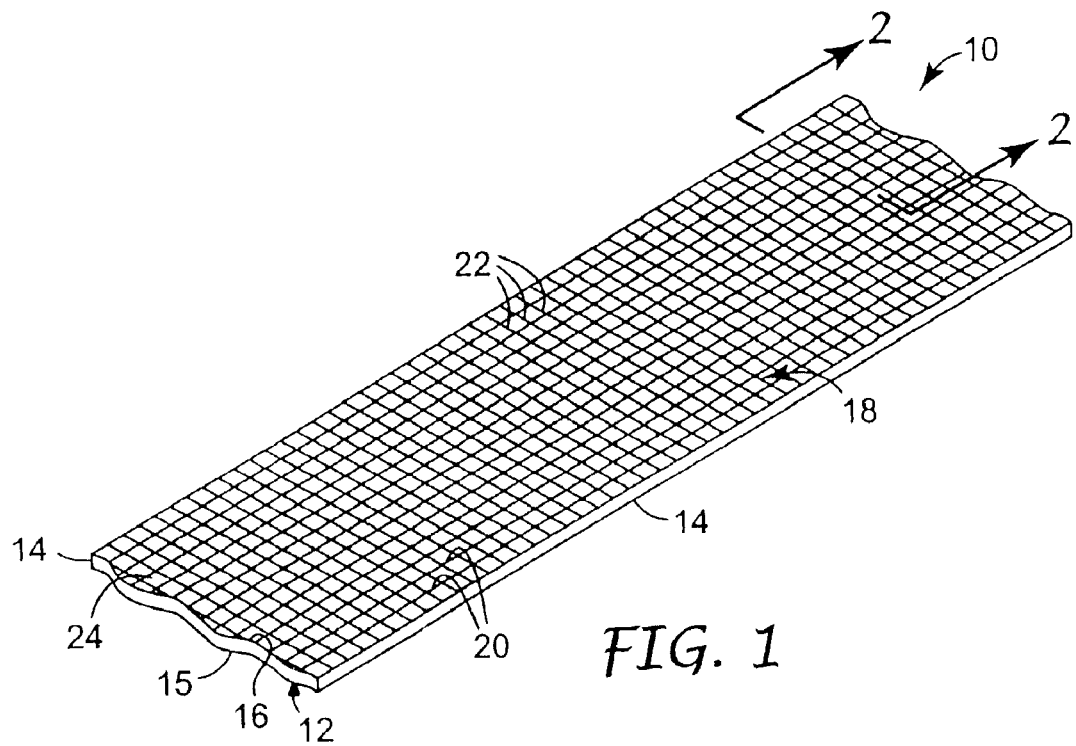
FIG. 1 is a plan view of an embodiment of a duct tape of the present invention.
Figure 2:
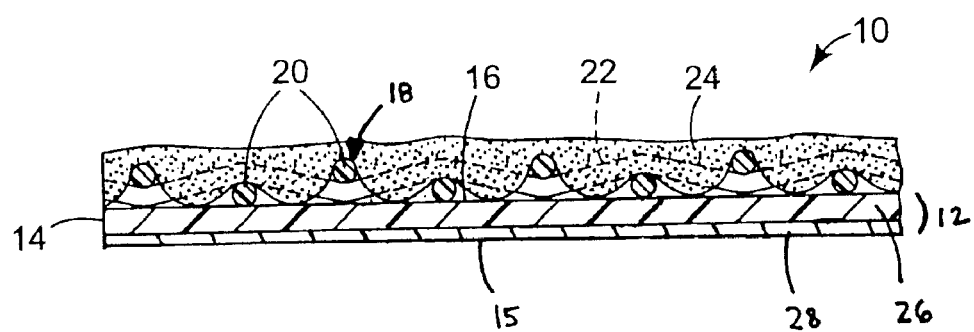
FIG. 2 is a sectional view of the embodiment of FIG. 1 taken along line 2—2.

Referring now to FIGS. 1 and 2, there is shown a first embodiment of a length of duct tape according to the present invention generally designated by the reference numeral 10.

Generally, the length of duct tape 10 comprises an elongate backing layer 12 having opposite longitudinally extending edges 14 and opposite first and second major surfaces 15 and 16, respectively. A scrim extends along the second major surface 16 of the backing layer 12 and is covered by a layer 24 of pressure sensitive adhesive along the second surface 16 of the backing layer 12.

The scrim 18 includes warp elements 20 and weft elements 22 that are woven or knitted together to form the scrim. The warp elements 20 extend longitudinally along the backing layer 12 and are uniformly transversely spaced between the longitudinal edges 14 of the backing layer 12. The weft elements 22 extend transversely along the backing layer 12 at right angles to its longitudinal edges 14 and are uniformly spaced longitudinally along the backing layer 12.

The layer of pressure sensitive adhesive 24 along the second major surface 16 of the backing layer 12 covers the scrim 18 and adheres the scrim to the backing layer 12. The pressure sensitive adhesive 24 is commonly a rubber-based pressure sensitive adhesive although other types may also be suitable.

As shown in FIG. 2, backing layer 12 includes substrate layer 26 and release layer 28. Release layer 28 comprises a compatibilized release composition comprising an olefin-containing polymer and a polymeric release material. In some embodiments, release layer 28 further includes a diluent polymer. Substrate layer 26 comprises a thermoplastic polymer, and is preferably co-extruded with release layer 28 to provide backing layer 12. Substrate layer 26 and release layer 28 may each optionally include one or more additives to provide a desired property, for example, colorants, UV absorbers, antioxidants, and the like. Commonly, substrate layer 26 includes one or more colorants in order to provide tape 10 with a desired color. For example, it is common to include a colorant in order to provide duct tape 10 with the characteristic silver/gray color.

Figure 3:
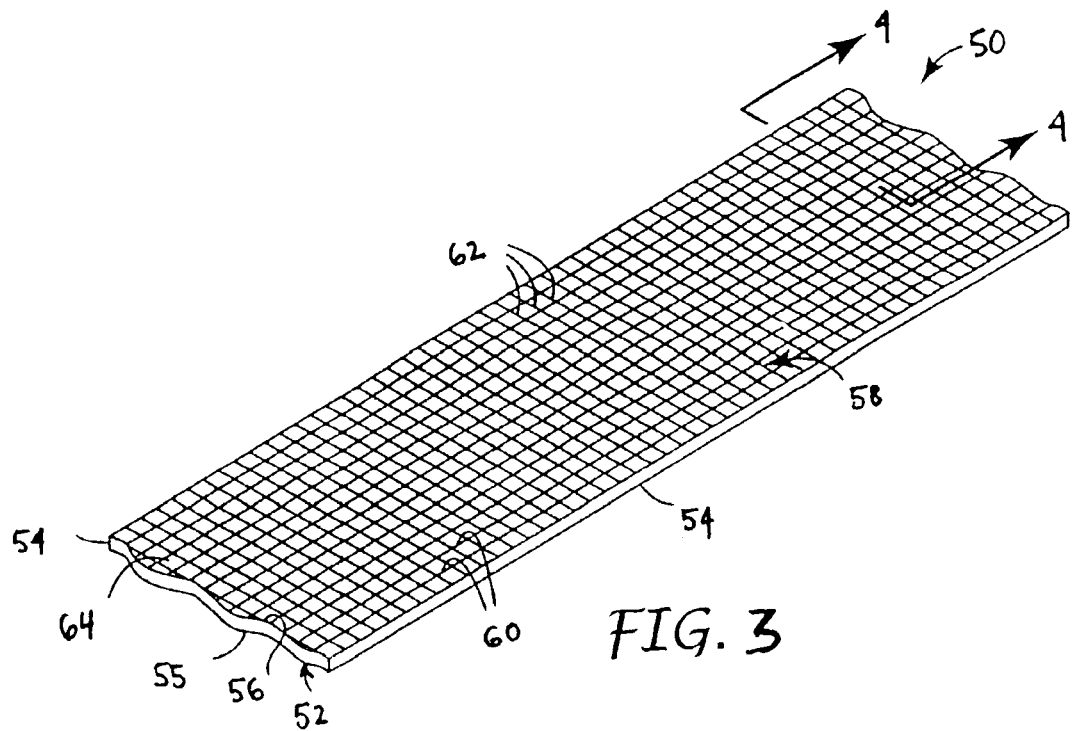
FIG. 3 is a plan view of an embodiment of a duct tape of the present invention
Figure 4:
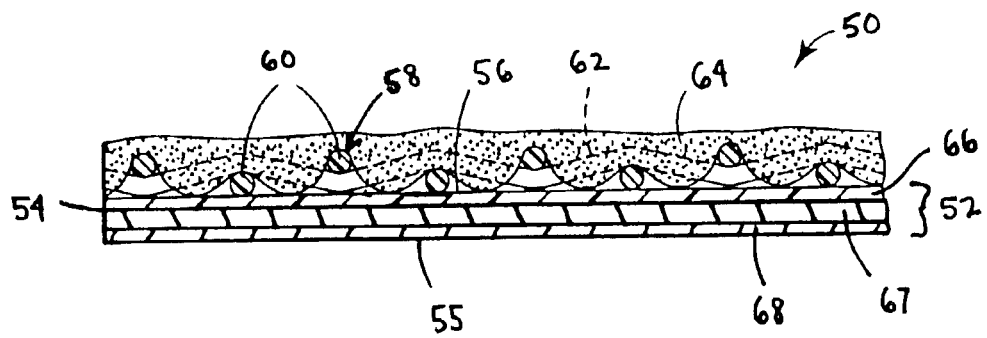
FIG. 4 is a sectional view of the embodiment of FIG. 3 taken along line 4—4.

Referring now to FIGS. 3 and 4, there is shown a second embodiment of a length of duct tape according to the present invention generally designated by the reference numeral 50.

Generally, the length of duct tape 50 comprises an elongate backing layer 52 having opposite longitudinally extending edges 54 and opposite first and second major surfaces 55 and 56. A scrim 58 extends along the second major surface 56 of the backing layer 52 and is covered by a layer 64 of pressure sensitive adhesive along the second surface 56 of the backing layer 52.

The scrim 58 includes warp elements 60 and weft elements 62 that are woven or knitted together to form the scrim 58. The warp elements 60 extend longitudinally along the backing layer 52 and are typically uniformly transversely spaced between the longitudinal edges 54 of the backing layer 52. The weft elements 62 extend transversely along the backing layer 52 at right angles to its longitudinal edges 54 and are typically uniformly spaced longitudinally along the backing layer 52.

The layer of pressure sensitive adhesive 64 along the second major surface 56 of the backing layer 52 covers the scrim 58 and adheres the scrim to the backing layer 52. The pressure sensitive adhesive 64 is commonly a natural or synthetic rubber pressure sensitive adhesive although other types may also be suitable.

As shown in FIG. 4, backing layer 52 includes first substrate layer 66, second substrate layer 67, and release layer 68. Release layer 68 comprises a compatibilized release composition comprising a polymeric release material and an olefin-containing polymer. In some embodiments, release layer 68 further includes a diluent polymer. First substrate layer 66 and second substrate layer 67 comprise thermoplastic polymers, and are preferably co-extruded along with release layer 68 to provide backing layer 52. First substrate layer 66, second substrate layer 67 and release layer 68 may each optionally include one or more additives to provide a desired property, for example, colorants, UV absorbers, antioxidants, and the like. Commonly, at least one of substrate layers 66 or 67 include one or more colorants in order to provide tape 50 with a desired color. For example, it is common to include a colorant in order to provide duct tape 50 with the characteristic silver/gray color.

Components making up the adhesive tapes of the present invention are described in more detail below.

Backing:

Backings for adhesive tapes of the present invention comprise a substrate layer in the form of a film having opposite first and second major surfaces and a release layer comprising a compatibilized release composition adhered to at least a portion of one major surface of the substrate. In some embodiments, the substrate layer comprises a multi-layered film, for example, comprising 2 layers, 3 layers, 4 layers, 5 layers, or more.

The backing typically has a thickness ranging from about 1 to 10 mils (25 to 254 μm), more preferably ranging from 1 to 5 mils (25 to 127 μm), and most preferably ranging from about 1 to 3 mils (25 to 76 μm). The thickness of the release layer may be varied within a wide range. Generally, it is preferred to have the release layer be as thin as possible in order to minimize cost. It is also generally preferred that the release layer is a continuous layer, completely covering the substrate. In this way, release force will be more consistent over the entire surface of the tape backing. Generally, the substrate layer comprises about 75% of the thickness of the backing or greater and the release layer comprise about 25% of the thickness or less. For example, a backing having a thickness of about 3 mils (76 μm) may have a substrate having a thickness of about 2.25 mils (57 μm) and a release layer having a thickness of about 0.75 mil (19 μm). In some embodiments, the substrate comprises about 90% of the thickness of the backing material or greater and the release layer comprises about 10% of the thickness or less. In other embodiments, the substrate comprises about 95% of the thickness of the backing material or greater and the release layer comprises about 5% of the thickness or less. For example, a backing having a thickness about 3 mils (76 μm) may have a substrate having a thickness of about 2.85 mils (72 μm) and a release layer having a thickness of about 0.15 mil (4 μm). If the release layer is oriented subsequent to extrusion, then the final thickness of the release layer may be about 0.1 μmm or less.

Substrate Layer:

Suitable polymers for the substrate layer of the backing include thermoplastic polymers, preferably thermoplastic polymers that can be extruded (e.g., using a blown film or cast film extrusion process). Representative examples of thermoplastic polymers include polyolefins (e.g., low density polyethylene (LDPE), high density polyethylene (HDPE), linear low density polyethylene (LLDPE), polypropylene and polybutylene), polyester, copolyester, polyamide (e.g., nylon), polyvinyl chloride, polycarbonate, polytetrafluoroethylene, and mixtures thereof. One example of a substrate is low density polyethylene commercially available under the trade designation "LD 129" from ExxonMobil Chemicals.

Release Layer:

The release layer of the backing comprises a compatibilized release composition comprising an olefin-based polymer, a polymeric release material, and an optional diluent polymer. Release compositions of the present invention are compatibilized compositions that comprise: an olefin-based polymer, a polymeric release material, and an optional diluent polymer. As used herein the term "compatibilized" means that materials making up the release composition form a stable multiphase morphology wherein the phases do not significantly coalesce and/or increase in size upon aging at temperatures at or above the glass transition temperature (Tg) or melting temperatures of the materials. The polymeric release material and the olefin-based polymer are compatibilized using a compatibilization scheme. As used herein the term "compatibilization scheme" refers to the method by which the olefin-based polymer and the polymeric release material are made to be compatible with one another due to a modification of their interfacial interactions. The compatibilization scheme comprises functionalizing the polymeric release material and olefin-based polymer in such a way that an acid-base interaction is present between the two materials. The acid-base interaction that is present between the polymeric release material and the olefin-based polymer may be described as a Lewis acid-base type interaction. Lewis acid-base interactions require that one chemical component be an electron acceptor (acid) and the other an electron donor (base). The electron donor provides an unshared pair of electrons and the electron acceptor furnishes an orbital system that can accommodate the additional unshared pair of electrons. The following general equation describes the Lewis acid-base interaction:

The acid-base interactions between the polymeric release material and the olefin-based polymer reduce their interfacial tension leading to a reduction in the dispersed phase particle size, and a stabilization of the multiphase morphology. Advantageously, due to their compatibilized nature, release compositions of the present invention may be extrudable without pre-mixing the various components making up the release composition. That is, the olefin-based polymer, polymeric release material, and diluent polymer (if present) can be fed directly into a single screw extruder without the need to first pre-blend the materials using high shear melt mixing. The acid-base interactions between the polymeric release material and the olefin-based polymer also result in increased adhesion between the constituents of the blend. Therefore, release compositions of the present invention may be resistant to the transfer of the polymeric release material, for example, to a pressure sensitive adhesive removed from a release layer of the release composition.

It is to be understood that either the olefin-based polymer or the polymeric release material can contain the acid or the base functionality. For example, an acid functionalized olefin-based polymer can be paired with a base functionalized polymeric release material. Alternatively, a base functionalized polymeric release material can be paired with an acid functionalized olefin-based polymer.

Olefin-based Polymer:

The olefin-based polymer is functionalized in order to provide an acid-base interaction with the polymeric release material in accordance with the compatibilization scheme. Suitable olefin-based polymers are thermoplastic polymers that comprise at least an acid or a base functionality. As used herein the term "thermoplastic" is used to refer to a polymer material that softens to a melt-processable state when exposed to heat and returns to its original condition when cooled. As used herein the term "olefin-based" refers to a polymer that is derived from one or more olefins, for example, ethylene, propylene, butene, and/or isoprene.

The thermoplastic olefin-based polymer includes an acid or a base that is chemically bonded to the polymer chain. Acid functionality may be incorporated into thermoplastic olefin-based polymers, for example, by co-polymerizing olefins with acid-containing monomers, for example, acrylic acid, methacrylic acid, aleic acid, fumaric acid, phenolic, and chlorinated groups. Preferably, acid functionality is incorporated by co-polymerizing olefins with acrylic acid or methacrylic acid. Base functionality may be incorporated into thermoplastic olefin-based polymers, for example, by co-polymerizing olefins with monomers having basic groups such as amides, amines (including heterocyclic monomers such as vinyl pyridine, vinyl pyrolidone) and vinyl acetate.

Typically, the monomer providing the acid or base functionality will be included in the olefin-based polymer in an amount from about 3% to about 30% by weight of the polymer. For ethylene/acrylic acid copolymers, the acid functionality is typically included in an amount ranging from about 6% to about 10% by weight of the copolymer.

Representative examples of thermoplastic olefin-based polymers suitable for use include, for example, ethylene/acrylic acid copolymers, ethylene/methacrylic acid copolymers, acid-modified ethylene/vinyl acetate copolymers, and ethylene/vinyl acetate.

In order to provide extrudable compatibilized release compositions, it is generally preferable to process at a temperature that permits efficient extrusion and yet does not degrade the release composition. The temperature of processing is generally dependent upon the method of forming the compatibilized release composition. When the release layer is extrusion coated on a preformed substrate, the processing temperature of the release layer is independent of other layers. When co-extrusion processing is used, for example in blown film extrusion, the co-processed layers are generally extruded from the die at similar temperatures. For adhesive tapes of the present invention, it is generally preferred that the thermoplastic olefin-based polymer can be extruded at a temperature less than about 200° C., more preferably less than 190° C. Preferably, the olefin-based polymer can be extruded at a temperature ranging from about 165° C. to about 185° C. If the extrusion temperature of the compatibilized release composition is too high, the acid and base groups present to compatibilize the release composition may react with one another (e.g., carboxylic acid groups may react with amine groups to form amides) forming a crosslinked composition that is difficult or impossible to extrude.

Suitable thermoplastic olefin-based polymers include the ethylene/acrylic acid copolymers commercially available under the trade designations "PRIMACOR 3440" and "PRIMACOR 3460" from Dow Chemical Company, Midland Mich. PRIMACOR 3440 comprises about 9% by weight acrylic acid and has a melt flow index of 10. PRIMACOR 3460 comprises about 9% by weight acrylic acid and has a melt flow index of 20. Suitable ethylene/methacrylic acid copolymers are commercially available under the trade designation "NUCREL" from DuPont Chemical Co., Wilmington Del. Suitable acid-modified ethylene/vinyl acetate copolymers are commercially available under the trade designations "BYNEL 1124". Other suitable olefin-based polymers include polymers that have base functionality such as ethylene/vinyl acetate copolymers. Suitable commercially available ethylene/vinyl acetate include "ELVAX 3185" from DuPont.

The thermoplastic olefin-based polymer is typically present in the compatibilized release composition in an amount ranging from about 1% to about 99% by weight of the compatibilized release composition, more typically about 70% to about 99% by weight of the compatibilized release composition. If a diluent polymer is present, then the thermoplastic olefin-based polymer is typically present in an amount ranging from about 1% to about 60% by weight of the compatibilized release composition with the diluent polymer typically being present in an amount ranging from about 40% to 98% by weight of the compatibilized release composition, and the polymeric release material being present in an amount ranging from about 1% to 30% by weight of the compatibilized release composition.

Polymeric Release Material:

The polymeric release material includes an acid or a base functionality that is selected to provide an acid-base interaction with the olefin-based polymer according to the compatibilization scheme. For example, if the olefin-based polymer is acid functionalized then suitable polymeric release materials will be base functionalized in order to provide for an acid-base interaction between the olefin-based polymer and the polymeric release material. Similarly, if the thermoplastic olefin-based polymer is base functionalized then suitable polymeric release materials will be acid functionalized.

Representative examples of polymeric release materials include polyvinyl N-alkyl carbamates, polyvinyl N-alkyl carbamides, poly alkyl(meth)acrylate copolymers, silicone polyurea segmented copolymers, and siloxane-acrylate block or graft copolymers.

Polyvinyl N-alkyl carbamates and polyvinyl alkyl carbamides are random copolymers that may be represented by formula (I):

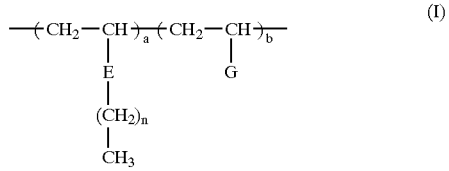

where:

a and b are selected to provide the desired release characteristics and other desired properties with the proviso that a≠0;

E is, independently,

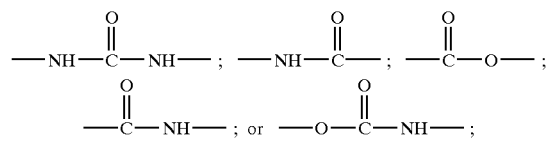

G is, independently,

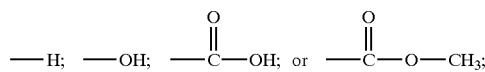

n is 11 to 21; preferably n =17.

Polyvinyl N-alkyl carbamates are described, for example, in U.S. Pat. No. 2,532,011 (Dalquist et al.), the disclosure of which is incorporated herein by reference. Representative examples of polyvinyl N-alkyl carbamates include polyvinyl octadecyl carbamate, which is commercially available under the trade designations "ESCOAT P20" from Anderson Development Co. (Adrian, Mich.) and "MAYZO 95H" available from Mayzo Inc. (Norcross Ga.). Typically, polyvinyl octadecyl carbamate release material has a molecular weight from about 50,000 to about 300,000 grams/mole. Polyvinyl alkyl carbamide release materials include the polyethyleneimine alkyl carbamide commercially available under the designation "MAYZO RA-60R" from Mayzo Inc.

Polyvinyl alkyl carbamate release materials and polyvinyl alkyl carbamide release materials provide base functional groups (e.g., urethanes or ureas) and are appropriately paired with olefin-based polymers comprising acid functional groups according to the compatibilization scheme. One suitable olefin-based polymer for use with polyvinyl alkyl carbamate release materials is a copolymer of ethylene/acrylic acid.

Poly alkyl(meth)acrylate copolymer release materials may be described generally as copolymers including at least one higher alkyl (meth)acrylate and at least one acid monomer or one basic monomer. For example, a poly alkylacrylate release material may be prepared by the free-radical copolymerization of octadecyl acrylate with acrylic acid. The acrylic acid present in the release material provides acid functionality for compatibilization with the olefin-based polymer. Poly alkyl(meth)acrylates may be represented by general formula (II):

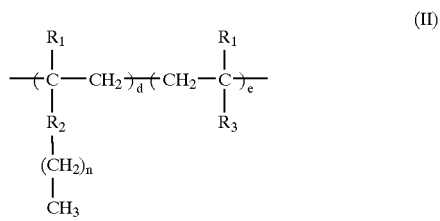

where:

$R_1$ is, independently, —H or —CH$_3$;

$R_2$ is 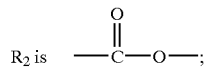

$R_3$ is, independently, alkyl; aryl; —OH; —H; —CN;

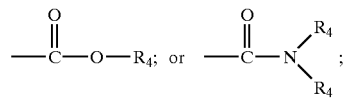

where:

$R_4$ is, independently, —H or alkyl;

n is 11 to 21; preferably n=17; and d and e are selected to provide the desired release characteristics and other properties, with the proviso that d≠0.

Acid monomers include, for example, acrylic acid and methacrylic acid. When acid group monomers are used, the acid functionalized poly alkyl(meth)acrylate release material is appropriately paired with an olefin-based polymer that is base functionalized. Base group monomers include, for example, n-vinyl pyrolidone, N, N-dimethyl acrylamide, and acrylonitrile. When base group monomers are used, the base functionalized poly alkyl(meth)acrylate release material is appropriately paired with olefin-based polymers comprising acid functional groups. Other monomers may also be included in poly alkyl(meth)acrylate release materials, for example, methylacrylate, methylmethacrylate, and styrene. Poly alkyl(meth)acrylate release materials are described, for example, in U.S. Pat. Nos. 2,607,711 (Hendriks) and 3,011,988 (Luedke et al.), the disclosures of which are incorporated herein by reference.

Silicone polyurea segmented copolymer release materials are reported, for example, in U.S. Pat. No. 5,214,119 (Leir et al.), the disclosure of which is incorporated herein by reference. Silicone polyurea segmented copolymer release materials may be represented by formula (III):

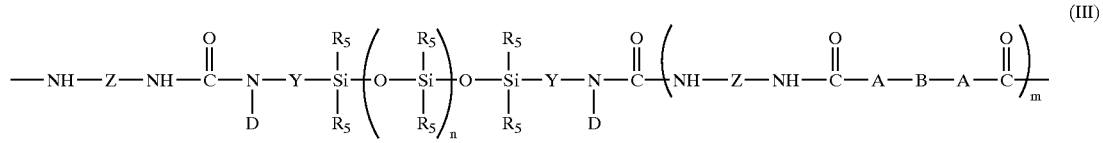

where:
Z is a divalent radical selected from the group consisting of phenylene, alkylene, aralkylene and cycloalkylene;
Y is an alkylene radical of 1 to 10 carbon atoms;
$R_5$ is at least about 50% methyl or greater with the balance of the $R_5$ radicals being selected from the group consisting of monovalent alkyl radicals having from 2 to 12 carbon atoms, a substituted alkyl radical having 2 to 12 carbon atoms, a vinyl radical, a phenyl radical, and a substituted phenyl radical;
D is selected from the group consisting of hydrogen, and an alkyl radical of 1 to 10 carbon atoms;
B is selected from the group consisting of alkylene, aralkylene, cycloalkylene, phenylene, polyethylene oxide, polypropylene oxide, polytetramethylene oxide, polyethylene adipate, polycaprolactone, polybutadiene, and mixtures thereof, and a radical completing a ring structure including A to form a heterocycle;
A is selected from the group consisting of —O— and

where $R_8$ is selected from the group consisting of hydrogen, and alkyl radical of 1 to 10 carbon atoms, phenyl, and a radical which completes a ring structure including B to form a heterocycle;
n is a number which is 10 or larger, and
is a number which can be 0 to about 25.

The urea and/or urethane linkages in the compounds of formula (III) provide base functionality for compatibilization with acid functionalized olefin-based polymers according to the compatibilization scheme.

Siloxane-acrylate block copolymers may also be used as the polymeric release material in release compositions of the present invention. One example of siloxane-acrylate block copolymers are graft copolymers. A siloxane-acrylate graft copolymer may be prepared by free radical co-polymerization of compounds of formula (IV) with one or more vinyl monomers.

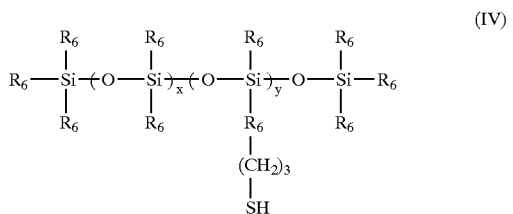

where:
x>y;
x+y>20;
y is 1 or greater; and $R_6$ is at least about 50% methyl or greater with the balance of the $R_6$ radicals being selected from the group consisting of monovalent alkyl radicals having from 2 to 12 carbon atoms, a substituted alkyl radical having 2 to 12 carbon atoms, a vinyl radical, a phenyl radical, and a substituted phenyl radical.

Representative examples of vinyl monomers include, for example, methyl methacrylate, butyl methacrylate, isobornylmethacrylate, methyl acrylate, vinyl acetate, n-vinyl pyrolidinone, acrylic acid, methacrylic acid, and the like. Acid or base functionalizing of the acrylate graft copolymers is introduced by appropriate choice of vinyl monomer(s). For example, acrylic acid or methacrylic acid will provide acid functional groups while n-vinyl pyrolidinone or vinyl acetate will provide base functional groups.

Other siloxane-acrylate graft copolymers may be prepared, for example, by reacting compounds of formula (V) by free radical co-polymerization with one or more vinyl monomers at least one of which is acidic or basic.

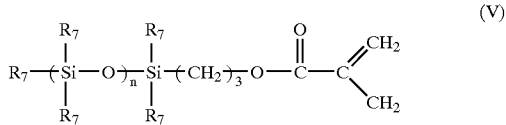

where:
n is 10 or greater; and
$R_7$ is at least about 50% methyl or greater with the balance of the $R_7$ radicals being selected from the group consisting of monovalent alkyl radicals having from 2 to 12 carbon atoms, a substituted alkyl radical having 2 to 12 carbon atoms, a vinyl radical, a phenyl radical, and a substituted phenyl radical.

Siloxane-acrylate block copolymers are described, for example, in U.S. Pat. Nos. 4,728,571 (Clemens et al.), 5,229,179 (Kumar et al.), and 5,154,962 (Mertens et al.), the disclosures of which are incorporated herein by reference.

The polymeric release material is present in the compatibilized release composition in an effective amount for imparting the desired release force. For example, if the amount of polymeric release material in the compatibilized release composition is too low, the release layer will not exhibit sufficiently low release force to be useful. If the amount of polymeric release material is too high, the pressure sensitive adhesive may release too easily from the release layer. In addition, the cost of a release layer having a high concentration of polymeric release material may be cost prohibitive. Taking into account the above considerations, the polymeric release material is typically present in an amount from about 1% to about 30% by weight of the compatibilized release composition, more typically from about 2% to about 10% by weight of the compatibilized release composition, and most typically from about 2% to about 5% by weight of the compatibilized release composition. Amounts outside of these ranges may also be suitable in some instances.

The compatibilized release composition may optionally comprise a diluent polymer. When present, the diluent polymer typically replaces a portion of the olefin-based polymer to provide a release composition that may be more cost effective to manufacture and/or may have one or more improved properties. Suitable diluent polymers include, for example, polyolefins or polyolefin copolymers. Typically, the diluent polymer will be present in an amount from about 40% to about 98% by weight of the compatibilized release composition. An example of a diluent polymer is low density polyethylene resin commercially available under the trade designation "LD 129" from ExxonMobil Chemicals.

A representative example of a compatibilized release composition suitable for use in the present invention comprises, by weight, about 92% diluent polymer ("LD 129" low density polyethylene from Exxon Mobil), 5% olefin-containing polymer ("PRIMACOR 3460" ethylene/acrylic acid copolymer from Dow Chemical) and 3% polymeric release material ("ESCOAT P20" polyvinyl octadecyl carbamate release resin from Anderson Development Company).

One or more of the layers making up the backing may optionally include one or more additives for imparting a desired property. Representative examples of additives include colorants (e.g., Ampacet 19698 (grey) or 12105 (silver) from Ampacet Corp., Tarrytown N.J.), UV absorbers, UV inhibitors, UV shields (e.g., carbon black), antioxidants, fillers, whitening agents, and the like. One preferred whitening agent is 2,5-thiophenediylbis(5-tert-butyl-1,3-benzoxazole) that is commercially available under the trade designation "UVITEX OB" from Ciba Chemicals (Tarrytown, N.Y.). Such a whitening agent may be included in the release layer and is useful as a guide in determining the coverage of the release layer on the substrate. For example, when viewed under ultraviolet light, the whitening agent in the release layer fluoresces thereby allowing an observer to visually determine if the release layer completely covers that substrate. Suitable whitening agents will be stable at (or above) the extrusion temperature and will not chemically decompose or degrade during extrusion.

Figure 5:
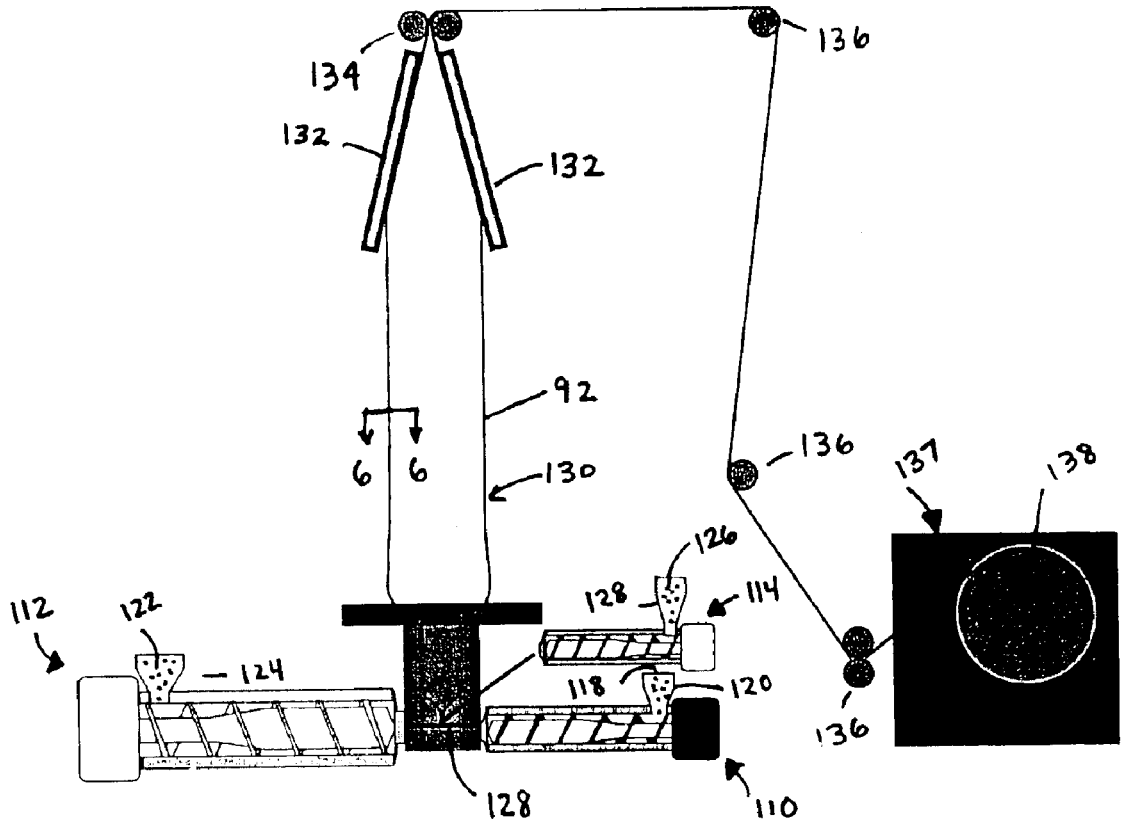
FIG. 5 is a schematic representation of a blow film extrusion process for manufacturing a backing for the adhesive tape of the present invention.
Figure 6:
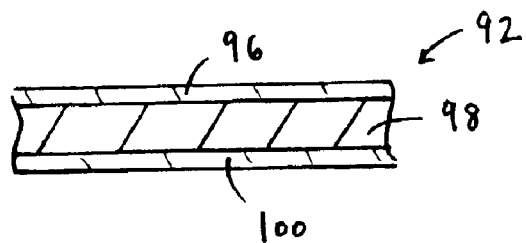
FIG. 6 is a sectional view of the backing of FIG. 5 taken along line 6—6.

The backing may optionally include a tie layer. Tie layers may be used, for example, to improve adhesion between the release layer and the substrate. Suitable tie layer compositions may be selected by one of skill in the art with reference to the composition of the two layers that are being bonded to one another with the tie layer. One versatile tie layer material is the acid-modified ethylene/vinyl acetate copolymer commercially available under the trade designation "BYNEL 1124" from DuPont Chemical Company. Other tie layer compositions are commercially available from DuPont Chemical Company. In some embodiments, the substrate is co-extruded with the release layer to directly provide the backing. One suitable process for co-extruding the substrate with the release layer is blown film extrusion. Referring now to FIG. 5 a schematic representation of a blown film extrusion process useful for producing a backing layer for an adhesive tape of the present invention is shown. The blown film process includes three single screw extruders 110, 112, and 114 which simultaneously feed 3-layer extrusion die 116. Extruder 110 is loaded with first polymer composition 118 through hopper 120. Extruder 112 is loaded with second polymer composition 122 through hopper 124. Extruder 114 is loaded with compatibilized release composition 126 through hopper 128. In certain embodiments, the compatibilized release composition is fed into hopper 128 as a dry blended mixture of polymeric release material, pellets of olefin-based polymer, and optionally pellets of diluent polymer. In this way, high shear melt mixing to provide a homogeneous pelletized feed of the compatibilized release composition is not required. Alternatively, rather than dry blending, the components of the compatibilized release composition may be individually metered as they are fed into hopper 128. In operation, extruders 110, 112, and 114 simultaneously feed first polymer composition 118, second polymer composition 122, and compatibilized release composition 126, respectively, through runners 128 and into 3-layer extrusion die 116. Extrusion die 116 forms a 3-layer backing 92 in the form of an annular-shaped bubble 130. Annular bubble 130 is fed through collapsing frame 132 and nip rolls 134 where the annular bubble 130 is collapsed. Backing 92 is then fed through a series of rollers 136 and is wound into roll 138 at winder 137. Referring now to FIG. 6 a cross-section of backing 92 is shown. Backing 92 includes first layer 96, second layer 98, and third layer 100. First layer 96 and second layer 98 together form the substrate layer of the backing 92. Third layer 100 is the release layer of backing 92 comprising the compatiblized release composition.

Scrim:

The scrim will typically be a woven or knitted scrim that is readily tearable in at least the cross-web direction. The scrim includes a plurality of warp elements oriented in the machine or down-web direction of the scrim and a plurality of weft elements that are oriented in the cross-web direction of the scrim. The warp elements are typically arranged such that they are uniformly spaced and substantially parallel to one another. Similarly, the weft elements are typically arranged such that they are uniformly spaced and substantially parallel to the other weft elements. Relative to one another, the warp elements are substantially perpendicular to the weft elements.

The warp and weft elements may comprise filaments, multi-filaments (i.e., filament bundles), yarns, threads, or a combination thereof. The elements may be twisted or textured, for example, to add loft and/or stretch to the scrim.

The warp and weft elements are typically combined by a weaving or knitting process to form the scrim. Examples include plain weaves (i.e., one-over-one weaves), drill weaves (i.e., two-over-one weave), twill weaves (i.e., three-over-one weave), and sateen weaves (i.e., four-over-one weave of the warp yarns over the weft yarns). A preferred woven construction is a plain (one-over-one) weave.

The scrims typically have a warp density ranging from about 9 to about 60 warp elements per inch (3.5 to 23 warp elements per cm), more typically ranging from about 12 to about 30 warp elements per inch (5 to 12 warp elements per cm). The weft density typically ranges from about 5 to about 30 weft elements per inch (2 to 12 weft elements per cm), more typically ranging from about 7 to about 15 weft elements per inch (3 to 6 weft elements per cm). Scrims having a loose weave (i.e., low warp/weft density) provide a low cost construction generally having a lower tensile strength. Scrims having a tighter weave (i.e., higher warp/weft density) result in a higher cost construction generally having a higher tensile strength. Unbalanced weave constructions are useful, for example, when a particular performance property is desired in one direction. For example, it is common to have a higher scrim density in the warp direction than in the weft direction in order to provide increased tensile strength in the longitudinal direction of the tape.

The denier of the warp and weft elements are typically selected to provide a tape that can be easily hand torn in the transverse direction, the longitudinal direction, or both. If the denier is too large, the tape will not tear easily. If the denier is too small, the warp and weft elements may not effectively control the direction of tear. That is, the warp and weft elements may be too weak to direct the tear in a substantially straight line. Suitable denier will depend upon the type of element (i.e., filament, multi-filament, yarn, etc.) and the strength of the material used. Typically, the warp elements have a denier ranging from about 40 to 150, more preferably ranging from about 70 to 110. Typically, the weft elements have a denier ranging from about 70 to 300, more preferably ranging from about 110 to 200.

The scrim may be made of natural materials or synthetic materials. Examples of natural materials include cotton, silk, hemp, flax, and combinations thereof. Examples of synthetic materials include polyester, acrylic, polyolefin (e.g., polyethylene and polypropylene), nylon and combinations thereof. Natural materials and synthetic materials may also be combined, for example, in a 65/35 polyester/cotton blend or a 80/20 polyester/cotton blend.

Representative examples of commercially available scrims include those manufactured by American Fiber & Finishing, Inc. (Newberry, S.C.) having a 70 denier multi-filament polyester warp yarn and a 150 denier multi-filament polyester weft yarn woven in a one-over-one weave and having a scrim density of 30 warp/inch×10 weft/inch (12 warp/cm×4 weft/cm), 30 warp/inch×8 weft/inch (12 warp/cm×3 weft/cm), 25 warp/inch×7 weft/inch (10 warp/cm×3 weft/cm), 22 warp/inch×7 weft/inch (9 warp/cm×3 weft/cm), or 20 warp/inch×6 weft/inch (8 warp/cm×2 weft/cm).

Adhesive:

Representative examples of pressure-sensitive adhesives useful in tapes of the present invention include those based on natural rubbers, synthetic rubbers, or acrylics. A summary of useful pressure sensitive adhesives can be found, for example, in Satas, *Handbook of Pressure Sensitive Adhesive Technology* (2$^{nd}$ Edition, 1989, Van Nostrand Reinhold).

Useful natural rubber pressure-sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include, but are not limited to, wood rosin and its hydrogenated derivatives; terpene resins of various softening points, and petroleum-based resins, such as, "ESCOREZ 1300" and "ESCOREZ 1102" series of petroleum hydrocarbon resins from Exxon Mobil (Houston Texas), and "PICCOLYTE S" and "PICCOTAC B", from Hercules, Inc.

Antioxidants may be used to retard the oxidative attack on natural rubber, which can result in loss of the cohesive strength of the natural rubber adhesive. Useful antioxidants include but are not limited to, amines, such as N-N'di-β-naphthyl-1,4-phenylenediamine, available as "AGERITE D"; phenolics, such as 2,5-di-(t-amyl) hydroquinone, available as "SANTOVAR A", from Monsanto Chemical Co., tetrakis[ethylene 3-(3',5'-di-tert-butyl-4'-hydroxyphenyl) propianate]methane, available as "IRGANOX 1010" from Ciba-Geigy Corp., and 2-2'-methylenebis(4-methyl-6-tert butyl phenol), available as "ANTIOXIDANT 2246"; and dithiocarbamates, such as zinc dithiodibutyl carbamate.

Typically, the pressure sensitive adhesive is applied to the scrim and substrate surface of the backing at a coating weight ranging from about 20 to about 60 grains/24 sq. inches (84 to 251 grams/m$^2$), more typically ranging from about 25 to about 50 grains/24 sq. inches (105 to 209 grams/m2). Typically, the backing and scrim are brought into contact with one another and the pressure sensitive adhesive is coated over the scrim and backing. Alternatively, the scrim may be pre-bonded to the substrate layer of the backing, for example, using an adhesive or by heat laminating the scrim to the substrate. Suitable coating techniques for applying the pressure sensitive adhesive are well known to those of skill in the art and include, for example, calendaring (e.g., stripper roll calendaring) and die coating (e.g., slot die, drop die, or rotary rod die). Preferably, the pressure sensitive adhesive is applied as a 100% solids formulation that is heated to provide a coatable viscosity, for example, by contacting one or more heated rolls prior to being applied to the backing.

One suitable natural rubber based pressure sensitive adhesive comprises, by weight, about 29% natural rubber (CV-60), about 37% filler (SNOWHITE-12 from L.V. Lomas Ltd., Ontario Canada), about 32% tackifier (PICCOTAC B from Hercules), about 0.6% antioxidant (IRGANOX 1010 from Ciba Specialty Chemical, Inc.), about 1.2% whitener (TiO$_2$), and about 0.1% neutralizing mask (CE-12873 from Custom Essence Inc., Summerset N.J.).

Another useful class of pressure-sensitive adhesives are those comprising synthetic rubber. Such adhesives are generally rubbery elastomers, which are either self-tacky or non-tacky and require tackifiers. Self-tacky synthetic rubber pressure-sensitive adhesives include for example, butyl rubber, a copolymer of isobutylene with less than 3 percent isoprene, polyisobutylene, a homopolymer of isoprene, polybutadiene, such as "TAKTENE 220 BAYER" or styrene/butadiene rubber. Butyl rubber pressure-sensitive adhesives often contain an antioxidant such as zinc dibutyl dithiocarbamate. Polyisobutylene pressure-sensitive adhesives do not usually contain antioxidants. Synthetic rubber pressure-sensitive adhesives, which generally require tackifiers, are also generally easier to melt process. They comprise polybutadiene or styrene/butadiene rubber, from 10 parts to 200 parts of a tackifier, and generally from 0.5 to 2.0 parts per 100 parts rubber of an antioxidant such as "IRGANOX 1010." An example of a synthetic rubber is "AMERIPOL 1011A", a styrene/butadiene rubber available from BF Goodrich.

Tackifiers that are useful include derivatives of rosins such as "FORAL 85", a stabilized rosin ester from Hercules, Inc., the "SNOWTACK" series of gum rosins from Tenneco, and the "AQUATAC" series of tall oil rosins from Sylvachem; and synthetic hydrocarbon resins such as the "PICCOLYTE A" series, polyterpenes from Hercules, Inc., the "ESCOREZ 1300" series of $C_5$ aliphatic olefin-derived resins, the "ESCOREZ 2000" series of $C_9$ aromatic/aliphatic olefin-derived resins, and polyaromatic $C_9$ resins, such as the "PICCO 5000" series of aromatic hydrocarbon resins, from Hercules, Inc. Other materials that may be added include hydrogenated butyl rubber, pigments, plasticizers, liquid rubbers, such as "VISTANEX LMMH" polyisobutylene liquid rubber available from Exxon, and curing agents to partially vulcanize the adhesive.

Acrylic pressure-sensitive adhesives generally have a glass transition temperature of about −20° C. or less and may comprise from 100 to 80 weight percent of a $C_3$–$C_{12}$ alkyl ester component such as, for example, isooctyl acrylate, 2-ethyl-hexyl acrylate and n-butyl acrylate and from 0 to 20 weight percent of a polar component such as, for example, acrylic acid, methacrylic acid, ethylene vinyl acetate, N-vinyl pyrrolidone and styrene macromer. Preferably, the acrylic pressure-sensitive adhesives comprise from 0 to 20 weight percent of acrylic acid and from 80 to 100 weight percent of isooctyl acrylate.

Acrylic pressure-sensitive adhesives may be self-tacky or tackified. Useful tackifiers for acrylics are rosin esters such as "FORAL 85", available from Hercules, Inc., aromatic resins such as "PICCOTEX LC-55WK", aliphatic resins such as "PICCOTAC 95", available from Hercules, Inc., and terpene resins such as α-pinene and β-pinene, available as "PICCOLYTE A-115" and "ZONAREZ B-100" from Arizona Chemical Co. Other materials may be added for special purposes, including hydrogenated butyl rubber, pigments, and curing agents to vulcanize the adhesive partially.

Other materials that may be added to the above-described pressure sensitive adhesives to impart a desired property include, for example, fillers, pigments, whitener (e.g., $TiO_2$), neutralizing mask (e.g., CE-12873 from Custom Essence Inc., Summerset N.J.) to cover odor and curing agents to partially cure or vulcanize the pressure-sensitive adhesive.

EXAMPLES

These examples are merely for illustrative purposes only and are not meant to be limiting on the scope of the appended claims. All parts, percentages, ratios, etc. in the examples and the rest of the specification are by weight unless indicated otherwise.

| Table of Abbreviations | |
| --- | --- |
| BYNEL 1124 | An acid-modified ethylene/vinyl acetate copolymer, commercially available from DuPont Chemical Co.; Wilmington, DE |
| ESCOAT P20 | Polyvinyl octadecyl carbamate release resin commercially available from Anderson Development Company Adrian, MI |

| -continued | |
| --- | --- |
| Table of Abbreviations | |
| LDPE | Gray pigmented LD 129.24 low density polyethylene commercially available from Exxon Chemical, Houston, TX |
| PE Resin | Same as the LDPE described above without the gray pigment. |
| Polypropylene Film | Film prepared from Polypropylene 3445 |
| PRIMACOR 3440 | Ethylene/acrylic acid copolymer containing approximately 9% acrylic acid with a melt flow index of 10 commercially available from Dow Chemical, Midland, MI |
| PRIMACOR 3460 | Ethylene/acrylic acid copolymer containing approximately 9% acrylic acid with a melt flow index of 20 commercially available from Dow Chemical, Midland, MI |
| Test Tape 1 | 375 Box Sealing Tape commercially available from 3M Company, St. Paul, MN |
| Test Tape 2 | SCOTCH SATIN Tape commercially available from 3M Company, St. Paul, MN |
| Test Tape 3 | SCOTCH 141 Mailing Tape commercially available from 3M Company, St. Paul, MN |
| UVITEX OB | Whitening agent, commercially available from Ciba Speciality Chemicals; Tarrytown, NY |
| MAYZO 95H | Polyvinyl octadecyl carbamate release resin commercially available from Mayzo Company, Norcross, GA |
| ELVAX 3185 | An ethylene/vinyl acetate copolymer, commercially available from DuPont Chemical Co.; Wilmington, DE |
| Polypropylene 3445 | Polypropylene commercially available from Exxon Chemicals Houston, TX |

Test Methods

Release Force and Readhesion Testing

This peel adhesion test is similar to the test method described in ASTM D 3330-90 except that the stainless steel substrate was replaced by a glass substrate. Samples were prepared for release testing by attaching the non-release side of the film (the backing layer) to a glass plate using double-coated adhesive tape (commercially available from Minnesota Mining & Manufacturing Co.; St. Paul, Minn. under the trade designation STA 305). A 2.54-centimeter wide strip of a Test Tape was adhered to the release layer using 2 passes of a 2 kg hard rubber roller.

The tapes were either peeled immediately (initial release) or allowed to dwell for 1 week at RT (room temperature) or 49° C. (heat aged), prior to peeling to find the peel adhesion value for each tape. The peel force was measured using an IMASS slip/peel tester (Model 3M90, commercially available from Instrumentors Inc., Strongsville, Ohio) at a peel angle of 180° and a peel rate of 2.3 meters/minute (90 inches/minute).

Readhesion values were measured by taking the tapes peeled from the release surface and rolling them onto a clean glass plate. The readhesion samples were then peeled on the IMASS slip/peel tester (Model 3M90, commercially available from Instrumentors Inc., Strongsville, Ohio) at a peel angle of 180° and a peel rate of 2.3 meters/minute (90 inches/minute).

Peel adhesion of a previously non-bonded Test Tape sample to the clean glass plate was measured as the control adhesion. The readhesions are reported as the percentage of the control adhesion.

Unwind Test

The unwind test is very similar to the test method described in PSTC-8 or ASTM D3811, except that the average unwind force is reported instead of the maximum value. Rolls of 50.8 millimeter wide were mounted in an unwind fixture affixed to a Constant Rate of Extension machine (Instron Model 5544, Instron Corporation, 100 Royal Street, Canton, Mass.). Two successive unwind measurements were taken from each roll. Two tape rolls were evaluated for each release layer construction. Therefore, the reported values are the average of four measurements. The unwind forces for the tape rolls were measured at 0.3 meters/minute (12 inches/minute) unwind rate before and after heat aging for one week at 49° C.

180° Peel Adhesion

This peel adhesion test is similar to the test method described in ASTM D 3330-90. Adhesive tapes were cut into 1.27 centimeter by 15 centimeter strips. Each strip was then adhered to a stainless steel substrate using a 2-kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 0.30 meters/minute (12 inches/minute) over a five second data collection time. Two samples were tested; the reported peel adhesion value is an average of the peel adhesion value from each of the two samples.

Examples 1–2

Step 1: Preparation of Release Blend:

90 parts PRIMACOR 3460 and 10 parts ESCOAT P20 (premixed with 0.05% by weight UVITEX OB) were dry blended to form a Release Material.

Step 2: Preparation of Release Coated Film:

Three-layer release film backings were prepared by coextruding the Release Material prepared in Step 1 from a single-screw extruder and a tie layer (BYNEL 1124 for Example 1, and PRIMACOR 3460 for Example 2) processed through a single-screw extruder at a temperature of 170–200° C. onto length-oriented Polypropylene Film. The film thus formed was width-oriented. A summary of the release material layer and tie layer are presented in Table 1.

Release Force testing was carried out on the film prepared in this way using the test method described above with Test Tapes 1 and 2. The Results are shown in Table 2.

Example 3

Step 1: Preparation of Release Blend 90 parts PRIMACOR 3440 and 10 parts ESCOAT P20 (premixed with 0.05% by weight UVITEX OB) were dry blended to form a Release Material.

Step 2: Preparation of Release Coated Film:

Same for Example 1–2 except that PRIMACOR 3440 was used in place of PRIMACOR 3460 as the tie layer. A summary of the release material layer and tie layer are presented in Table 1.

Release Force testing was carried out on the film prepared in this way using the test method described above with Test Tapes 1 and 2. The Results are shown in Table 2.

Comparative Example C1

A three layer construction was prepared as for Examples 1–3 except that only ESCOAT P20 was used as the Release Material. The tie layer was BYNEL 1124. A summary of the release material layer and tie layer are presented in Table 1.

Release Force testing was carried out on the film prepared in this way using the test method described above with Test Tapes 1 and 2. The Results are shown in Table 2.

Example 4

Step 1: Preparation of Release Blend:

PRIMACOR 3460 was fed into the feed zone of a 30-millimeter diameter, counter-rotating twin-screw extruder having a 27:1 length-to-diameter ratio (Model MP2030TC, available from APV Chemical Machinery Inc.; Saginaw,Mich.) at a rate of 7.7 kilograms/hour (17 pounds/hour). The extruder had double-start, fully intermeshing screws through the first four zones and single-start fully intermeshing screws through the remaining zones. The screw rotation rate was 150 revolutions per minute. ESCOAT P20 premixed with 0.05% by weight UVITEX OB, was fed into the first zone at a rate of 0.90 kilograms/hour (2 pounds/hour) to give 10 weight % ESCOAT P20. The temperature profiles for all of the zones were set at 175° C. The resultant blended polymer strand was extruded into a 3-millimeter-diameter strand, quenched in an ice water bath, pelletized and collected.

Step 2: Preparation of Release Coated Film:

A two-layer release film backing was prepared by extruding the Release Material prepared in Step 1 from a single-screw without a "tie" layer onto Polypropylene Film. The film thus formed was simultaneously biaxially oriented. A summary of the release material layer is presented in Table 1.

Release Force testing was carried out on the film prepared in this way using the test method described above with Test Tapes 1 and 2. The Results are shown in Table 2.

Example 5

Step 1: Preparation of Release Blend:

PRIMACOR 3440 was fed into the feed zone of a 30-millimeter diameter, counter-rotating twin-screw extruder having a 27:1 length-to-diameter ratio (Model MP2030TC, available from APV Chemical Machinery Inc.; Saginaw, Mich.) at a rate of 7.7 kilograms/hour (17 pounds/hour). The extruder had double-start, fully intermeshing screws through the first four zones and single-start fully intermeshing screws through the remaining zones. The screw rotation rate was 150 revolutions per minute. ESCOAT P20 premixed with 0.05% by weight UVITEX OB, was fed into the first zone at a rate of 1.81 kilograms/hour (4 pounds/hour) to give 20 weight % ESCOAT P20. The temperature profiles for all of the zones were set at 175° C. The resultant blended polymer strand was extruded into a 3-millimeter-diameter strand, quenched in an ice water bath, pelletized and collected.

Step 2: Preparation of Release Coated Film:

Three-layer release film backings were prepared by coextruding the Release Material prepared in Step 1 from a single-screw and a "tie" layer of PRIMACOR 3440 processed through a single-screw extruder onto Polypropylene Film. The film thus formed was simultaneously biaxially oriented. A summary of the release material layer and tie layer are presented in Table 1.

Release Force testing was carried out on the film prepared in this way using the test method described above with Test Tapes 1 and 2. The Results are shown in Table 2.

Examples 6–7

Step 1: Preparation of Release Blend:

The same procedure described for Example 5 was followed with the ESCOAT P20 replaced by MAYZO 95H, the UVITEX OB used at 0.1% by weight and the reagent ratios shown in Table 1.

Step 2: Preparation of Release Coated Film:

The same procedure described for Example 5 was followed to prepare 3-layer release backings.

Release Force testing was carried out on the film prepared in this way using the test method described above with Test Tapes 1 and 2. The Results are shown in Table 2. Additionally Release Force testing was carried out with Test Tape 3 and these data are shown in Table 3.

Comparative Examples C2–C3

Step 1: Preparation of Release Blend:

The same procedure described for Example 5 was followed with the PRIMACOR 3440 replaced by Polypropylene 3445 or ELVAX 3185 and the reagent ratios shown in Table 1.

Step 2: Preparation of Release Coated Film:

The same procedure described for Example 5 was followed to prepare 3-layer release backings.

Release Force testing was carried out on the film prepared in this way using the test method described above with Test Tapes 1 and 2. The Results are shown in Table 2. Additionally Release Force testing was carried out with Test Tape 3 and these data are shown in Table 3.

TABLE 1

| Example | Release Material Description | Tie Layer |
| --- | --- | --- |
| 1 | 90/10 PRIMACOR 3460/ESCOAT P20 | BYNEL 1124 |
| 2 | 90/10 PRIMACOR 3460/ESCOAT P20 | PRIMACOR 3460 |
| 3 | 90/10 PRIMACOR 3440/ESCOAT P20 | PRIMACOR 3440 |
| C1 | ESCOAT P20 | BYNEL 1124 |
| 4 | 90/10 PRIMACOR 3460/ESCOAT P20 | None |
| 5 | 80/20 PRIMACOR 3440/ESCOAT P20 | PRIMACOR 3440 |
| 6 | 90/10 PRIMACOR 3440/MAYZO 95H | PRIMACOR 3440 |
| 7 | 95/5 PRIMACOR 3440/MAYZO 95H | PRIMACOR 3440 |
| C2 | 96/4 Polypropylene 3445/ESCOAT P20 | PRIMACOR 3440 |
| C3 | 90/10 ELVAX 3185/ESCOAT P20 | PRIMACOR 3440 |

TABLE 2

| Example | Test Tape 1 Release Force after RT 1 week in N/dm (Readhesion %) | Test Tape 1 Release Force after 49° C. 1 week in N/dm (Readhesion %) | Test Tape 2 Release Force after RT 1 week in N/dm (Readhesion %) | Test Tape 2 Release Force after 49° C. 1 week in N/dm (Readhesion %) |
| --- | --- | --- | --- | --- |
| 1 | 1.3 (102) | 1.8 (99) | 6.6 (112) | 8.0 (106) |
| 2 | 1.9 (98) | 3.0 (103) | 10.0 (96) | 10.8 (93) |
| 3 | 1.8 (104) | 2.3 (100) | 7.5 (108) | 8.6 (98) |
| C1 | 4.8 (90) | 9.2 (84) | 8.4 (83) | 7.9 (90) |
| 4 | 1.8 (101) | 2.5 (98) | 7.1 (95) | 7.4 (87) |
| 5 | 1.8 (99) | 1.1 (111) | 7.4 (107) | 7.0 (111) |
| 6 | 2.1 (98) | 3.4 (99) | 7.8 (91) | 9.7 (89) |
| 7 | 2.3 (96) | 8.3 (94) | 9.7 (84) | 13.0 (83) |
| C2 | 56.3 (75) | 63.8 (71) | 26.4 (91) | 28.6 (97) |
| C3 | 15.4 (82) | 13.2 (84) | 14.4 (77) | 14.1 (84) |

TABLE 3

| Example | Test Tape 3 Release Force after RT 1 week in N/dm (Readhesion %) | Test Tape 3 Release Force after 49° C. 1 week in N/dm (Readhesion %) |
| --- | --- | --- |
| 6 | 3.2 (97) | 4.0 (94) |
| 7 | 4.3 (94) | 9.3 (89) |
| C2 | 61.7 (76) | 60.1 (52) |
| C3 | 35.4 (74) | 14.8 (81) |

Examples 8–13 and Comparative Example C4

Release film backings of 63.5 micrometers (2.5 mils) in thickness were prepared on a blown film process line by using three single screw extruders to feed a three layer annular die to form the three layer film bubble. The melt temperatures in the extruders and the die were set at 175° C. The middle and one outer layer were composed of LDPE, while the other outer layer was composed of a PRIMACOR 3460/ESCOAT P20 release material blend. The thickness of the release layer was varied between 5% and 10% of the total film thickness. The 90/10 blend of PRIMACOR 3460/ESCOAT P20 prepared in Step 1 of Example 1 was dry blended with further PRIMACOR 3460 resin, and fed to the hopper of the extruder feeding the release layer, in order to get to achieve the levels of the ESCOAT P20 release component shown in Table 4. For Comparative Example C4 only PRIMACOR 3460 resin was used.

TABLE 4

| Example | Release Layer Composition Ratio of PRIMACOR 3460/ ESCOAT P20 | Release Layer Thickness (% of total film thickness) |
| --- | --- | --- |
| 8 | 98/2 | 7.5 |
| 9 | 97/3 | 10 |
| 10 | 95/5 | 10 |
| 11 | 90/10 | 5 |
| 12 | 97/3 | 7.5 |
| 13 | 96/4 | 7.5 |
| C4 | 100/0 | 7.5 |

Examples 14–16

The release film backings prepared in Examples 9–11 were made into tapes by rotary rod die coating a PSA and scrim to the Release Film at the PSA coat weight shown in Table 5. The PSA was a natural rubber/resin formulation comprised of natural rubber elastomer, tackifier, antioxidant and filler. The scrim was comprised of 100% polyester fibers in a multi-filament configuration with various fiber counts from 25×7 to 30×10. Unwind and 180° Peel adhesion to steel was carried out using the test methods described above. The results are shown in Table 6.

TABLE 5

| Example | Release Film Backing Example Number | PSA Coat Weight (grams/ square meter) |
| --- | --- | --- |
| 14 | 9 | 128 |
| 15 | 10 | 140 |
| 16 | 11 | 193 |

TABLE 6

| | Unwind Force (N/dm) | | 180° Peel Adhesion to Steel (N/dm) | |
| --- | --- | --- | --- | --- |
| Example | RT aged 1 week | 49° C. aged 1 week | RT aged 1 week | 49° C. aged 1 week |
| 14 | 48 | 62 | 66 | 57 |
| 15 | 34 | 39 | 67 | 53 |
| 16 | 28 | 53 | 57 | 47 |

Examples 17–22

Release film backings of 63.5 micrometers (2.5 mils) in thickness were prepared on a blown film process line by using three single screw extruders feed a three layer annular die to form the three layer film bubble. The melt temperatures in the extruders and the die were set at 175° C. The middle and an outer layer were composed of LDPE, while the other outer layer was composed of a PE Resin/ PRIMACOR 3460/ESCOAT P20 release material blend. The thickness of the release layer was 7.5% of the total film thickness. For Example 17, the 80/20 blend of PRIMACOR 3460/ESCOAT P20 prepared in Step 1 of Example 5 was dry blended with PE Resin and fed to the hopper of the extruder feeding the release layer, in order to achieve the composition ratio shown in Table 7. For Examples 18–22 all materials shown in Table 7 were dry blended and fed to the hopper.

TABLE 7

| Example | Release Layer Composition Ratio of PE Resin/PRIMACOR 3460/ESCOAT P20 | Release Layer Thickness (% of total film thickness) |
| --- | --- | --- |
| 17 | 80/16/4 | 7.5 |
| 18 | 76/20/4 | 7.5 |
| 19 | 86/10/4 | 7.5 |
| 20 | 91/5/4 | 7.5 |
| 21 | 92/5/3 | 7.5 |
| 22 | 90/5/5 | 7.5 |

Comparative Example C5

The same procedure used to prepare Examples 18–22 was followed except that the release layer was a blend of 95 parts PE Resin and 5 parts ESCOAT P20 without any PRIMACOR 3460. No further testing was possible with this composition, as a stable bubble could not be formed in the film making process and so it was not possible to make any film sample. With the mixing available in the Single Screw Extruder, this blend composition for this film layer was very splotchy and non-uniform and those defects were devastating to the film forming process.

Examples 23–30

The release film backings prepared in Examples 12–13 and 17–22 were made into tapes as described for Examples 14–16. Unwind and 180° Peel adhesion to steel testing was carried out using the test methods described above. The results are shown in Table 8.

TABLE 8

| | Release Film Backing Example Number | Unwind Force (N/dm) | | 180° Peel Adhesion to Steel (N/dm) | |
| --- | --- | --- | --- | --- | --- |
| Example | | Initial | 49° C. aged 1 week | Initial | 49° C. aged 1 week |
| 23 | 12 | 61.7 | 54.8 | 64.4 | 50.8 |
| 24 | 13 | 37.2 | 51.7 | 54.6 | 48.1 |
| 25 | 17 | 35.6 | 51.0 | 51.2 | 50.3 |
| 26 | 18 | 36.9 | 50.6 | 48.1 | 51.4 |
| 27 | 19 | 32.3 | 48.5 | 57.2 | 51.4 |
| 28 | 20 | 36.1 | 45.6 | 46.5 | 46.1 |
| 29 | 21 | 66.7 | 53.0 | 62.7 | 55.7 |
| 30 | 22 | 52.7 | 48.1 | 55.1 | 53.1 |

What is claimed is:
1. An adhesive tape comprising:
   (a) a backing comprising:
      (i) a release layer comprising a compatibilized release composition comprising:
         a thermoplastic olefin-based polymer comprising an acid or a base functionality;
         a polymeric release material comprising an acid or a base functionality;

wherein the functionality of the thermoplastic olefin-based polymer and the functionality of the polymeric release material provide an acid-base interaction; and
(ii) a substrate layer;
(b) a scrim; and
(c) a pressure sensitive adhesive layer coated over the scrim and the substrate layer of the backing.

2. The adhesive tape of claim 1, wherein the substrate layer comprises a first substrate layer and a second substrate layer.

3. The adhesive tape of claim 1, wherein the substrate layer comprises polyolefin.

4. The adhesive tape of claim 3, wherein the substrate layer comprises low density polyethylene, high density polyethylene, linear low density polyethylene or polypropylene.

5. The adhesive tape of claim 1, wherein the backing includes one or more optional additives selected from the group consisting of colorants, UV absorbers, UV inhibitors, UV shields, antioxidants, fillers, and whitening agents.

6. The adhesive tape of claim 1, wherein the pressure sensitive adhesive is based on natural rubber, synthetic rubber, or acrylic.

7. The adhesive tape of claim 1, wherein the scrim comprises woven multi-filament polyester yarns.

8. The adhesive tape of claim 1, wherein the backing is extruded by a blown film extrusion process.

9. The adhesive tape of claim 1, wherein the thermoplastic olefin-based polymer comprises an acid functionality and the polymeric release material comprises a base functionality.

10. The adhesive tape of claim 1, wherein the thermoplastic olefin-based polymer comprises a base functionality and the polymeric release material comprises an acid functionality.

11. The adhesive tape of claim 1, wherein the thermoplastic olefin-based polymer is selected from the group consisting of ethylene/acrylic acid copolymers, ethylene/methacrylic acid copolymers, and acid-modified ethylene/vinyl acetate copolymers.

12. The adhesive tape of claim 1, wherein the thermoplastic olefin-based polymer is an ethylene/acrylic acid copolymer.

13. The adhesive tape of claim 12, wherein the ethylene/acrylic acid copolymer comprises from about 3% to about 20% by weight acrylic acid.

14. The adhesive tape of claim 1, wherein the thermoplastic olefin-based polymer comprises from about 1% to about 99% by weight of the compatibilized release composition.

15. The adhesive tape of claim 1, wherein the polymeric release material is selected from the group consisting of polyvinyl N-alkyl carbamates, polyvinyl N-alkyl carbamides, poly alkyl(meth)acrylate copolymers, silicone polyurea segmented copolymers, and siloxane-acrylate block copolymers.

16. The adhesive tape of claim 1, wherein the polymeric release material is polyvinyl octadecyl carbamate.

17. The adhesive tape of claim 1, wherein the polymeric release material comprises from about 1% to about 30% by weight of the compatibilized release composition.

18. The adhesive tape of claim 1, wherein the compatibilized release composition further includes a diluent polymer.

19. The adhesive tape of claim 18, wherein the diluent polymer is selected from the group of resins consisting of polyolefins or polyolefin copolymers.

20. The adhesive tape of claim 19, wherein the diluent polymer is polyethylene or an ethylene/propylene copolymer.

21. The adhesive tape of claim 18, wherein the diluent polymer comprises from about 40% to about 98% by weight of the compatibilized release composition.

22. The adhesive tape of claim 18, wherein the olefin-based polymer comprises from about 1% to about 60% by weight of the compatibilized release composition.

23. The adhesive tape of claim 18, wherein the polymeric release material comprises from about 1% to about 30% by weight of the compatibilized release composition.

24. An adhesive tape comprising:
(a) a co-extruded blown film backing comprising:
(i) a first outer layer comprising a compatibilized release composition comprising:
an ethylene/acrylic acid copolymer;
a polyvinyl octadecyl carbamate release material; and
a diluent polymer comprising low density polyethylene;
(ii) a second outer layer comprising low density polyethylene;
(iii) an inner layer interposed between the first outer layer and the second outer layers, the inner layer comprising low density polyethylene;
(b) a scrim; and
(c) a pressure sensitive adhesive layer coated over the scrim and the second outer layer of the backing.

* * * * *

UNITED STATES PATENT AND TRADEMARK OFFICE
CERTIFICATE OF CORRECTION

PATENT NO. : 6,921,729 B2
DATED : July 26, 2005
INVENTOR(S) : Schwab et al.

Page 1 of 1

It is certified that error appears in the above-identified patent and that said Letters Patent is hereby corrected as shown below:

Title page,
Item [56], References Cited, OTHER PUBLICATIONS, delete "ExxonMobile" and insert -- ExxonMobil -- therefor.

Column 6,
Line 4, delete "0.1 μmm" and insert -- 0.1 μm --, therefor.

Column 7,
Line 38, delete "aleic" and insert -- maleic --, therefor.

Column 9,
Lines 30-34, after " 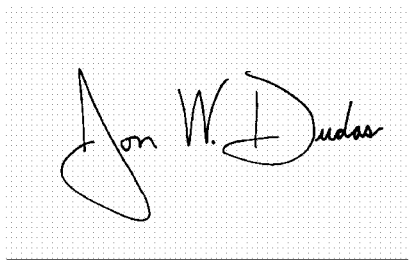 " insert -- and --.

Column 11,
Line 40, insert -- m -- before "is".

Column 12,
Line 18, delete "isobornylmethacrylate" and insert -- isobornylmethacrylate --, therefor.

Column 14,
Line 31, delete "compatiblized" and insert -- compatibilized --, therefor.

Column 16,
Line 13, after "tetrakis[" delete "ethylene" and insert -- methylene --, therefor.

Signed and Sealed this

Fifteenth Day of November, 2005

JON W. DUDAS
*Director of the United States Patent and Trademark Office*